United States Patent [19]
Ochiai et al.

[11] Patent Number: 5,447,375
[45] Date of Patent: Sep. 5, 1995

[54] METHOD OF CONTROLLING A GAP OF A HYDROSTATIC BEARING APPARATUS

[75] Inventors: Akira Ochiai, Susono; Katsuji Takahashi, Mishima; Kouya Watanabe, Numazu, all of Japan

[73] Assignee: Toshiba Kikai Kabushiki Kaisha, Tokyo, Japan

[21] Appl. No.: 246,418

[22] Filed: May 20, 1994

Related U.S. Application Data

[62] Division of Ser. No. 4,249, Jan. 14, 1993, Pat. No. 5,364,190.

Foreign Application Priority Data

Jan. 14, 1992 [JP] Japan .................. 4-5164
Mar. 2, 1992 [JP] Japan .................. 4-44940

[51] Int. Cl.⁶ ............................ F16C 32/06
[52] U.S. Cl. ..................... 384/100; 384/8; 384/12
[58] Field of Search ............. 384/8, 9, 12, 100, 114, 384/121; 29/898.02

[56] References Cited

U.S. PATENT DOCUMENTS

| | | | |
|---|---|---|---|
| 3,658,393 | 4/1972 | Luthi | 384/12 |
| 4,351,574 | 9/1982 | Furukawa et al. | 384/8 |
| 4,504,048 | 3/1985 | Shiba et al. | 384/12 X |
| 4,569,562 | 2/1986 | Sato et al. | 384/12 |
| 5,066,197 | 11/1991 | Champagne | 384/100 X |
| 5,238,308 | 8/1993 | Lang | 384/100 X |

*Primary Examiner*—Thomas R. Hannon
*Attorney, Agent, or Firm*—Fish & Richardson

[57] ABSTRACT

A hydrostatic bearing apparatus comprises a base member having a static pressure guide surface to which a static pressure pocket is formed, a temperature detector for detecting a temperature of an operation oil in the static pressure pocket at an outlet portion thereof and generating a signal representing the detected outlet temperature of the operation oil, a temperature controller for controlling a temperature of the operation oil to be supplied in the static pressure pocket in response to the signal from the temperature detector, and a pressure controller for controlling a pressure in the static pressure pocket by controlling a flow rate of the operation oil supplied to the static pressure pocket. An operation oil source storing the operation oil to be supplied to the static pressure pocket is further disposed. A gap between the static pressure guide surface and a member to be supported of the hydrostatic bearing apparatus is maintained always constant in accordance with the control of the operation oil temperature and the operation oil pressure.

3 Claims, 6 Drawing Sheets

METHOD OF CONTROLLING A GAP OF A HYDROSTATIC BEARING APPARATUS

This application is a division of U.S. application Ser. No. 08/004,249 filed Jan. 14, 1993 U.S. Pat. No. 5,364,190.

BACKGROUND OF THE INVENTION

The present invention relates to a hydrostatic bearing apparatus for supporting a movable member such as rotary table or reciprocally movable table through a hydrostatic bearing particularly for the purpose of maintaining constant a gap of the hydrostatic bearing and also relates to a method of controlling the hydrostatic bearing apparatus for achieving the same purpose.

There has been known a hydrostatic bearing in which a gap of the bearing is changed in response to a load change or temperature change and which supports a load by changing a pressure in a static pressure pocket of the bearing. When a hydrostatic bearing of the character described above is applied to, for example, a sliding surface of a machine tool, the change of the gap of the bearing caused by the change of the load directly affects on the performance of the machine tool, and in an adverse case, metallic contact is locally caused, thus damaging the sliding surface. Accordingly, there has been desired to provide a hydrostatic bearing in which the rigidity of the hydrostatic bearing is increased so as not to substantially change the bearing gap even if the load is changed.

In order to make large the rigidity of the hydrostatic bearing, a flow rate regulating valve is interposed between the hydrostatic bearing and an operation oil source to thereby adjust a supply amount of the operation oil in accordance with the load change of the hydrostatic bearing (for example, as disclosed in the Japanese Utility Model Laid-open (KOKAI) Publication No. 50-119027). In the flow rate regulating valve disclosed, an oil passage is formed in a spool slidably accommodated in a valve body for regulating the flow rate and the pressure. This oil passage is formed by drilling working or electric discharging working effected to the central portion of the spool.

Furthermore, in the conventional technology, for example, there are provided control methods of controlling an oil temperature of an operation oil utilized for the hydrostatic bearing of a machine tool, and the methods includes a method in which the temperature of the operation oil in an operation oil tank is accorded with a room temperature or a temperature of the machine tool by utilizing a refrigerating machine or cooler, and a method in which the operation oil temperature is accorded with a fixed value. Moreover, as a control method of a pressure of the hydrostatic bearing, a supply pressure of a hydraulic pump is made constant or a constant pressure valve is interposed on the way of the operation oil supply passage.

However, in the conventional technology described above, when drilling or boring working is effected to the inside of the spool to form an oil passage by the drilled bore or hole having a long length, it is considerably difficult to effect a fine drilling working with a large ratio of the length to the diameter of the hole and also difficult to ensure a size of the diameter, which results in a difference between the desired theory and the actual working. Furthermore, since the oil passage is formed with a small diameter hole, it is difficult to confirm the presence of the hole from the outside.

Furthermore, in the conventional apparatus, a good pressure—flow rate characteristic of the flow rate regulating valve and a good linearity thereof have not been achieved, and thus, it is difficult to achieve an initial object.

Further, it is considered to form a bearded groove on an outer peripheral surface of the spool instead of the hole, i.e. oil passage, but the bearded groove has not formed linearly, so that the working of such bearded groove requires troublesome working, and even if the working shape and dimension be made constant, it is difficult to stably produce the hydrostatic bearing always with the performance obtained by tests being maintained.

Moreover, in the oil temperature controlling method described above, it is aimed to coincide the temperature of the operation oil with a fixed temperature such as room temperature or a temperature of the machine. Accordingly, it is impossible to maintain the gap of the hydrostatic bearing because of the change of a viscosity of the operation oil due to a heat generation of the operation oil in the static pressure pocket of the hydrostatic bearing by a shearing force in accordance with, for example, the increasing or decreasing of a revolution number of a rotary table of a vertical lathe or reciprocation number of movement of a table of a planer, or the change of the pressure of the operation oil in the static pressure pocket in accordance with the change of the viscosity of the operation oil or an external force such as load. For the reasons described above, in a machine tool in which high performance, high quality and speed-up operation are required, the working performance of products is badly affected by the change of the gap of the hydrostatic bearing.

SUMMARY OF THE INVENTION

An object of the present invention is to substantially eliminate defects or drawbacks encountered in the prior art and to provide a hydrostatic bearing apparatus capable of maintaining constant a gap of the hydrostatic bearing apparatus under control of temperature and pressure of an operation oil in a static pressure pocket and hence improving a working precision of a product and further provide a method of controlling the hydrostatic bearing apparatus for the same purpose.

Another object of the present invention is to provide a hydrostatic bearing apparatus provided with a constant-pressure-ratio flow control valve or proportional electro-hydraulic flow control valve in which a spool accommodated in a valve body is movable in response to a change of a load on the hydrostatic bearing apparatus to thereby regulate the flow rate of the operation oil for the purpose of maintaining constant a gap of the hydrostatic bearing apparatus to achieve high hydrostatic rigidity and also provide a method of controlling the hydrostatic bearing apparatus for the same purpose.

These and other objects can be achieved according to the present invention by providing, in one aspect, a hydrostatic bearing apparatus comprising:

a base member having a static pressure guide surface to which a static pressure pocket means is formed;

a temperature detection means for detecting a temperature of an operation oil in the static pressure pocket means at an outlet portion thereof and generating a signal representing the detected outlet temperature of the operation oil;

a temperature control means for controlling a temperature of the operation oil to be supplied in the static pressure pocket means in response to the signal from the outlet temperature detection means;

a pressure control means for controlling a pressure in the static pressure pocket means by controlling a flow rate of the operation oil supplied to the static pressure pocket means; and an operation oil source storing the operation oil to be supplied to the static pressure pocket means, wherein a gap between the static pressure guide surface and a member to be supported of the hydrostatic bearing apparatus is maintained constant in accordance with the control of the operation oil temperature and the operation oil pressure.

In preferred embodiments, the pressure control means is a proportional electro-hydraulic flow control valve or a constant-pressure-ratio flow control valve.

When the constant-pressure-ratio flow control valve is adapted, the regulating valve comprises:

a valve body formed with a first cylinder portion having a small diameter and a second cylinder portion being continuous to the first cylinder portion and having a large diameter;

a first annular groove formed to a connection portion of the first and second cylinder portions and having a diameter larger than the diameter of the second cylinder portion;

a second annular groove formed to the first cylinder portion; and a spool having a first portion having a small outer diameter substantially equal to an inner diameter of the first cylinder portion of the valve body and a second portion having a large outer diameter substantially equal to an inner diameter of the second cylinder portion of the valve body, the spool being formed with a worked groove on an outer peripheral surface of the second portion of the spool and extending in an axial direction thereof, the second cylinder portion being communicated with the static pressure pocket means, the first cylinder portion being communicated with the operation oil source through the second annular groove, and the spool being slidably inserted into the first and second cylinder portions of the valve body.

The base member is a table base and the member to be supported is a table rotatably mounted on the table base.

In another aspect of the present invention, there is provided a method of controlling a gap between a static pressure guide surface and a member to be supported of a hydrostatic bearing apparatus provided with a static pressure pocket means so as to be maintained constant, comprising the steps of:

detecting a pressure in the static pressure pocket means;

calculating a designated pressure of the operation oil for making constant the gap of the hydrostatic bearing apparatus in response to the detected pressure;

controlling a supply pressure of the operation oil so that a pressure in the static pressure pocket means becomes the designated pressure;

detecting a temperature of the operation oil in the static pressure pocket means and a temperature thereof at an outlet portion of the static pressure pocket means;

calculating a designated temperature for supply to the static pressure pocket means for making constant the gap of the hydrostatic bearing apparatus in response to the detected temperatures; and controlling the supply temperature of the operation oil so that a temperature of the operation oil to be supplied to the static pressure pocket means becomes the designated temperature for supply.

The control of the temperature of the operation oil is carried out by a feedforward control by a predetermined set time and then a feedback control. The feedforward control is changed to the feedback control when the set time becomes zero, and the feedback control is performed so that a deviation between a temperature to be controlled and an aimed temperature becomes zero.

According to the characters of the present invention described above, the pressure in the static pressure pocket means is detected, and a designated pressure of the operation oil is calculated for making constant the gap of the hydrostatic bearing apparatus in response to the detected pressure. The supply pressure of the operation oil is controlled so that a pressure in the static pressure pocket means becomes the designated pressure. Then the temperature of the operation oil in the static pressure pocket means and a temperature thereof at an outlet portion of the static pressure pocket means are detected. The designated temperature for supply to the static pressure pocket means is detected for making constant the gap of the hydrostatic bearing apparatus in response to the detected temperatures, and the supply temperature of the operation oil is controlled so that a temperature of the operation oil to be supplied to the static pressure pocket means becomes the designated temperature for supply.

Accordingly, the temperature and pressure of the operation oil in the static pressure pocket can be controlled to be always constant, thus maintaining constant the gap of the hydrostatic bearing apparatus.

Further natures and features of the present invention will be described hereunder with reference to the accompanying drawings.

DESCRIPTION OF THE PREFERRED EMBODIMENTS

Figure 1:
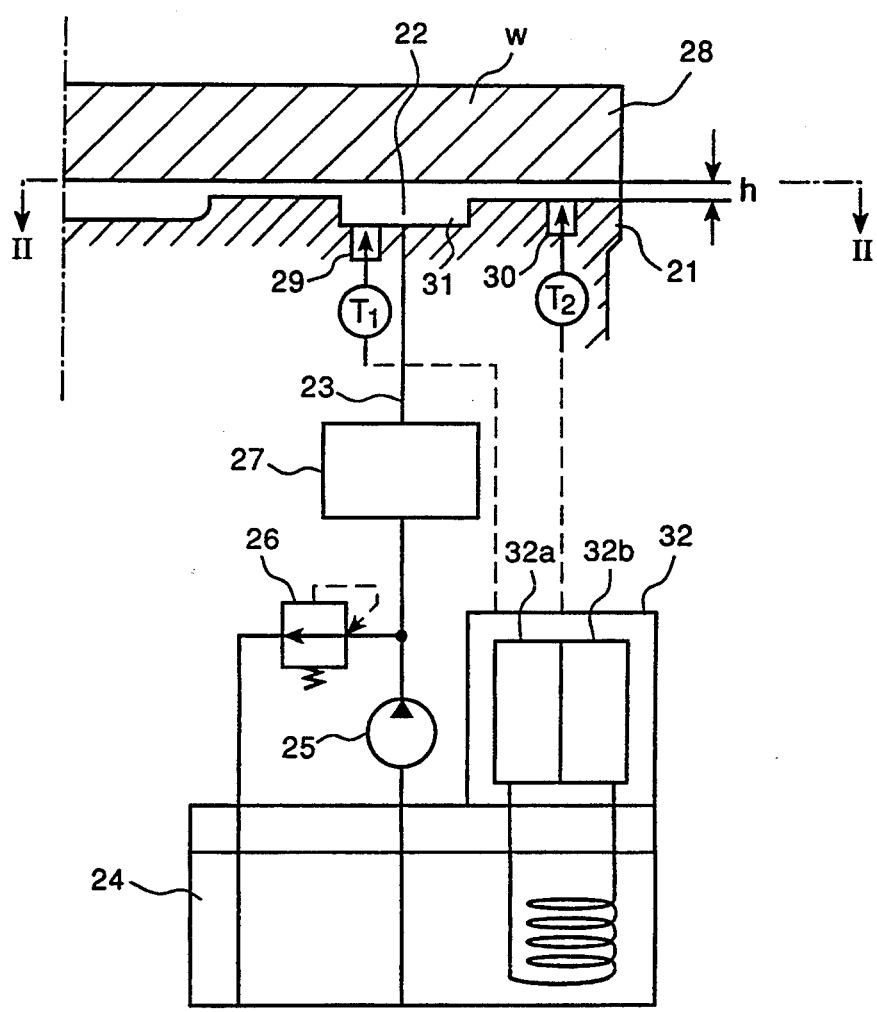
FIG. 1 is an illustration representing a hydrostatic bearing apparatus according to the present invention.
Figure 2:
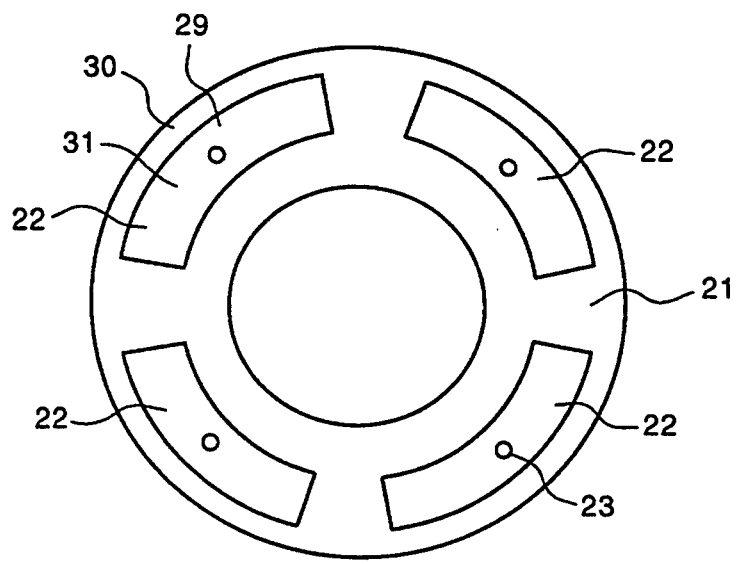
FIG. 2 is a view viewed from an arrowed line II—II of FIG. 1.

One preferred embodiment of the present invention will be first described hereunder with reference to FIGS. 1 and 2, in which FIG. 1 is a general view, partially in section, of a hydrostatic bearing apparatus according to the present invention and FIG. 2 is a view viewed from arrowed direction II—II in FIG. 1.

Referring to FIGS. 1 and 2, reference numeral 21 denotes a table base having an upper surface on which a plurality of static pressure pockets 22 are formed. An oil passage 23 through which an operation oil is supplied is connected to the static pressure pocket 22, and to the oil passage 23 are operably connected an operation oil tank 24, hydraulic pump 25, release valve 26 and a proportional electro-hydraulic flow control valve 27, which are all known themselves, constituting a hydraulic control circuit.

According to such arrangement, the operation oil in the operation oil tank 24 is supplied into each of the static pressure pockets 22 as pressurized oil through the proportional electro-hydraulic flow control valve 27.

A table 28 is rotatably mounted on the upper surface, as a guide surface, of the table base 21, and a temperature sensor 29 for detecting a temperature of the operation oil in the static pressure pocket 22, a temperature sensor 30 for detecting an outlet temperature of the operation oil and a pressure sensor for detecting a pressure in the static pressure pocket 22, are all provided for the table base 21.

Figure 3:
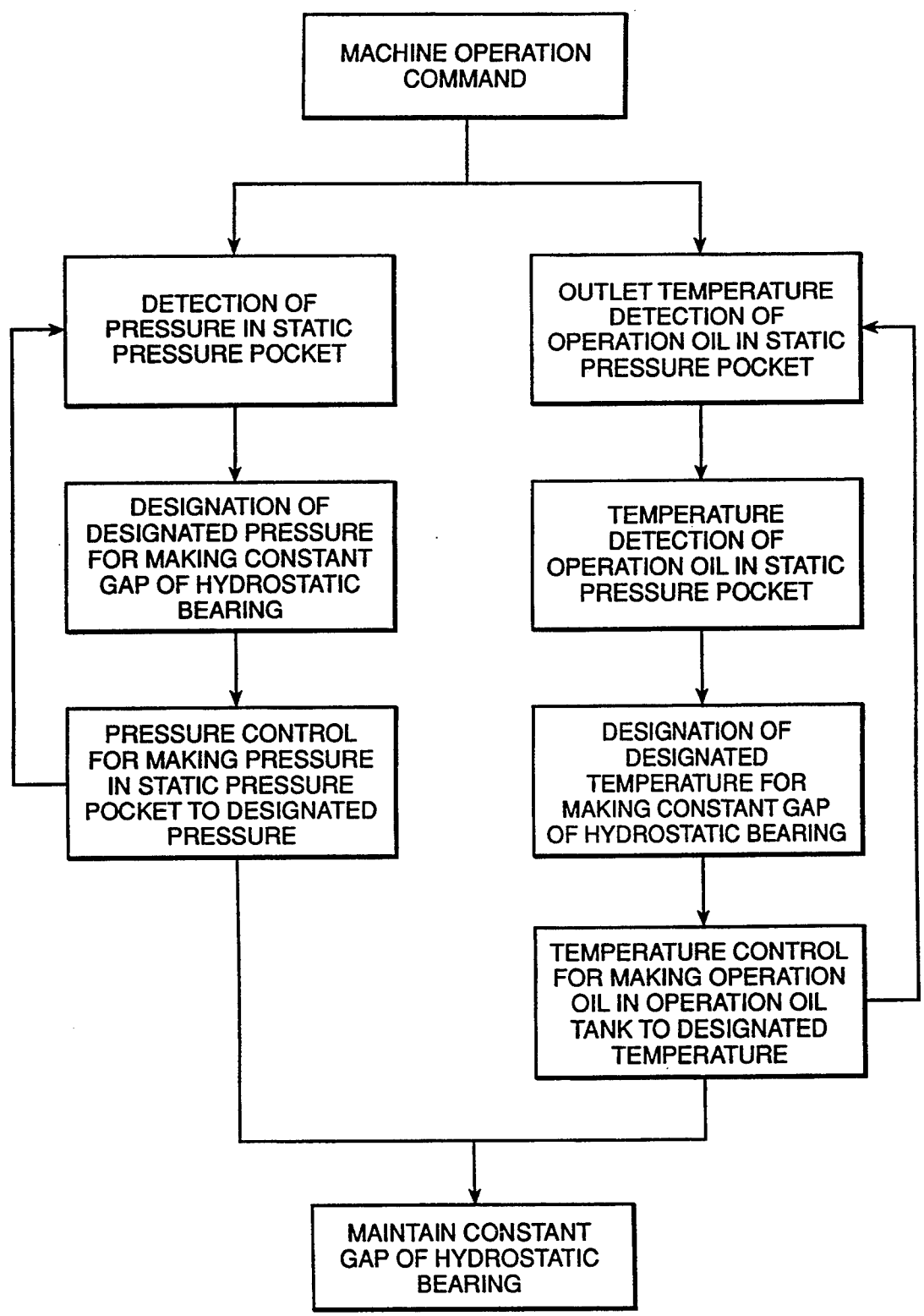
FIG. 3 is a flowchart showing a control mode executed by one embodiment of the bearing apparatus.

The temperature of the operation oil in the operation oil tank 24 is always detected as a drain oil temperature from the hydraulic pump 25 by another temperature sensor, not shown, and the temperature and pressure of the operation oil to be supplied to the static pressure pockets 22 are controlled for controlling a gap of the hydrostatic bearing, i.e. a gap h between the table base 21 and the table 28 to be constant. This control mode is represented by a control block of FIG. 3.

That is, the pressure in the static pressure pocket 22 is detected by the pressure sensor 31 in response to the operation command of a machine. Then, in response to the detected pressure, a pressure of the operation oil (designated pressure) for making constant the gap h of the hydrostatic bearing is calculated, and the supply pressure of the operation oil is regulated by the proportional electro-hydraulic flow control valve 27 so that the pressure in the static pressure pocket 22 during the operation coincides with the designated pressure.

On the while, the outlet temperature of the operation oil in the static pressure pocket 22 is detected by the temperature sensor 30 and the temperature of the operation oil in the static pressure pocket 22 is further detected by the temperature sensor 29, thus preliminarily storing, through calculation, the operation oil supplying temperature (designated temperature) for making constant the gap h of the hydrostatic bearing. During the subsequent operation, the temperature of the operation oil in the tank 24 is controlled by a temperature control unit 32 equipped with a cooler 32a and a heater 32b so that the temperature of the operation oil in the operation oil tank 24, i.e. the drain oil temperature from the hydraulic pump 25, coincides with the designated temperature.

In advance of this feedback control utilizing the proportional electro-hydraulic flow control valve 27, a feedforward control in accordance with an operation time amount Q preliminarily set is performed, and then, this control mode is changed to the feedback control. This feedforward control will be described with reference to the flowcharts of FIGS. 4 and 5.

Figure 4:
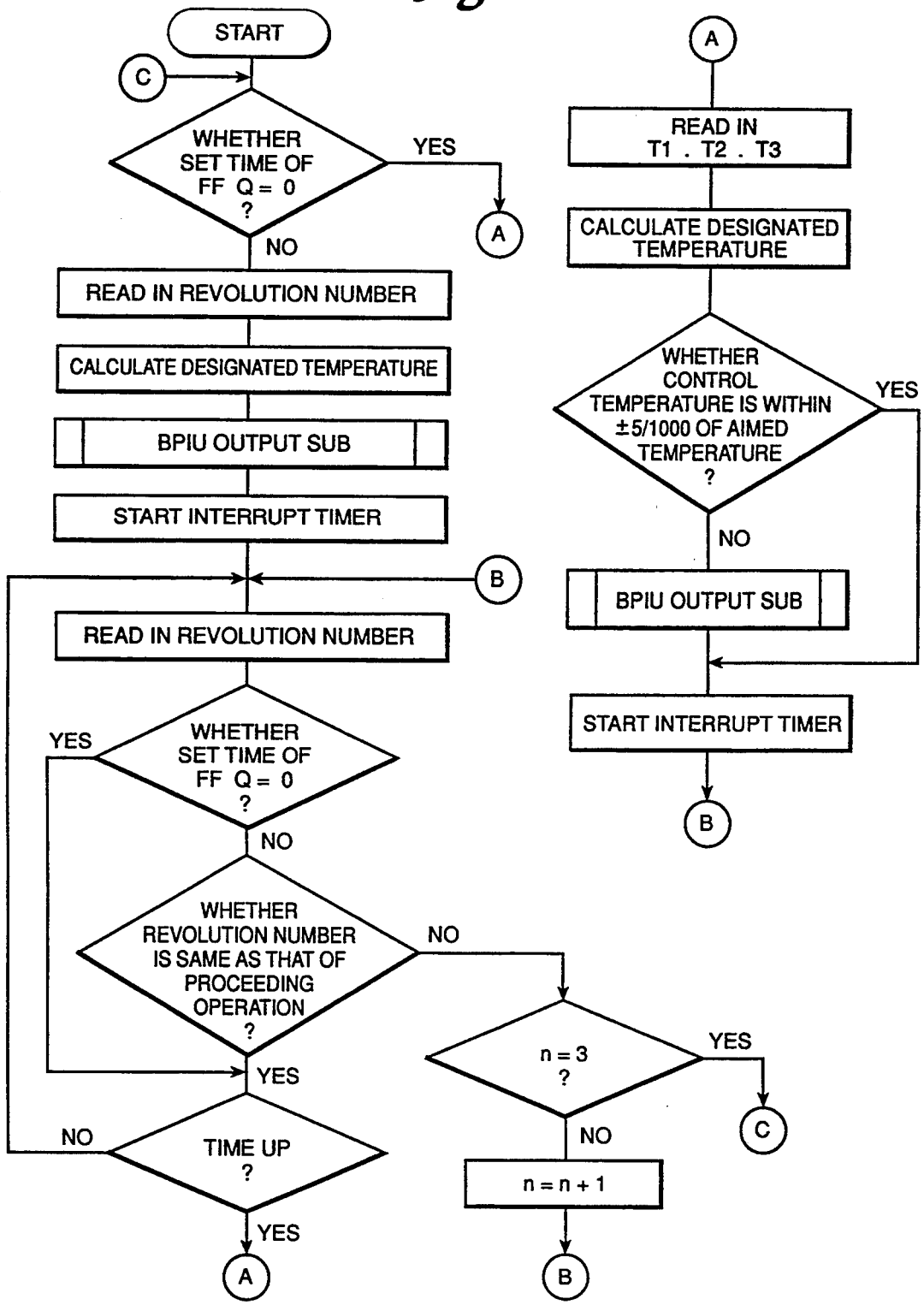
FIGS. 4 and 5 are flowcharts for feedforward and feedback controls by means of a temperature controller for controlling the operation oil.
Figure 5:
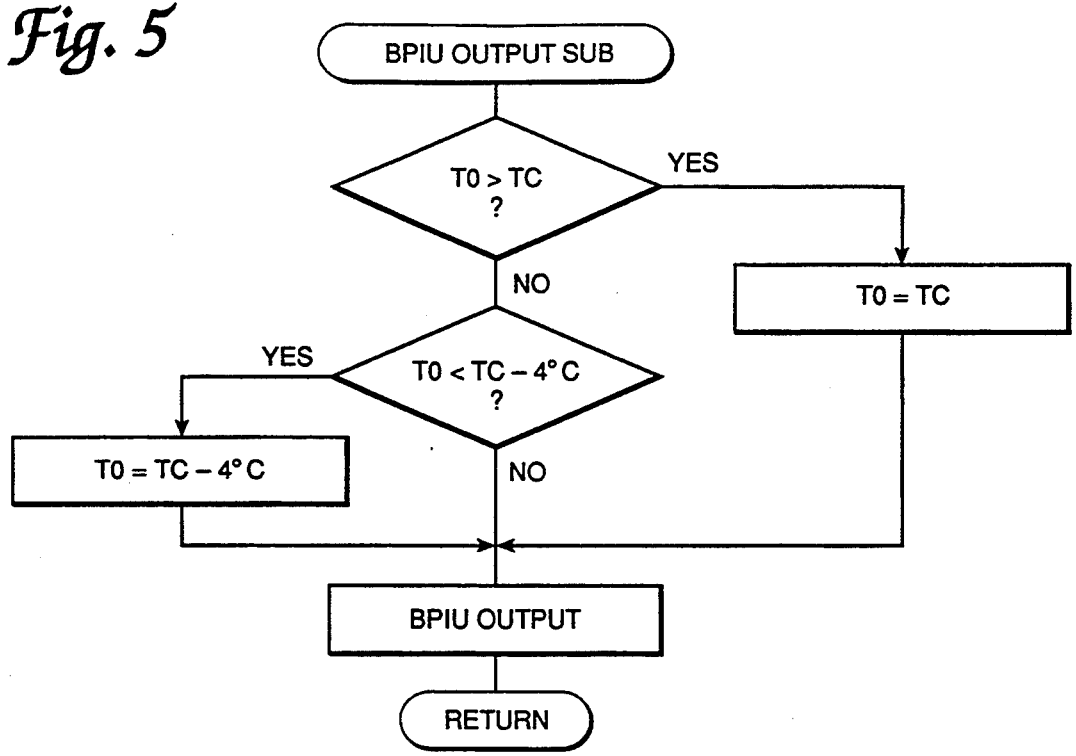

Referring to FIGS. 4 and 5, when the set time Q of the feedforward control is $Q \neq 0$, a read-in step of the revolution number of the table 28 is carried out to thereby calculate the designated temperature $T_0$. The read-in step is carried out, for example, twenty times, and an average thereof is adapted.

The designated temperature $T_0$ is calculated from the table revolution number R(rpm), a heat generation amount Q(W) of the operation oil in the static pressure pocket 22 in accordance with the following formula.

$$Q = K \cdot R^2$$

$$T_0 = T_C - (Q/W)\alpha \qquad \text{Formula (1)}$$

in which
$T_C$: aimed temperature (for example, 23.0° C.)
K: proportional constant (parameter, W/rpm)
W: water equivalent (flow rate×specific gravity, W/°C.)
$\alpha$: correction coefficient A temperature controller output preliminary operation (BPIU output SUB) is executed with respect to the designated temperature $T_0$ thus calculated to thereby determine an actual designated temperature $T_0$, which is outputted to an interface for specific use for the temperature controller and deemed to be a set temperature, thus performing the feedforward control. Namely, in the comparison of the designated temperature $T_0$ with the aimed temperature $T_C$, when the designated temperature $T_0$ is larger than the aimed temperature $T_C$ ($T_0 > T_C$), the designated temperature is decided as the aimed temperature ($T_0 = T_C$), whereas when the designated temperature is less than a temperature of aimed temperature $T_C - 4°$ C. ($T_0 < T_C - 4°$ C.), the designated temperature $T_0$ is decided as the temperature $T_C - 4°$ C. ($T_0 = T_C - 4°$ C.). In the other cases, the designated temperature $T_0$ is decided as the set temperature.

An interruption timer is then started to read in the revolution number. In this read-in step, when the read revolution numbers are different in three times from the proceeding revolution numbers, the feedforward control as mentioned above will be executed, and this operation is repeated throughout the set time Q.

When the set time Q of this feedforward control becomes Q=0, this feedforward control is changed to the feedback control, which will be described hereunder.

In this feedforward control, a command signal $T_0$ to the temperature controller is calculated in accordance with a preliminarily set calculation equation so that a deviation between a temperature TA° C. and the aimed temperature $T_C$° C. becomes zero (0), and during the set time interval (sampling time), the control is carried out with the thus calculated value being as the set value and, after the set time interval, information from the sensors is again taken in and calculated to thereby renew the designated temperature $T_0$ subsequently.

First, a drain oil temperature T1° C of the hydraulic pump 25 is detected by a sensor, not shown, an outlet temperature of the operation oil is detected by the temperature sensor 30, and a temperature T3° C of the operation oil in the static pressure pocket 22 is detected by the temperature sensor 29, respectively. The designated temperature $T_0$ is then calculated from the detected values. The detections or read-in operations of these temperatures are carried out, for example, 100 times and an average thereof is obtained.

The designated temperature $T_0$ is renewed, in a case where the outlet temperature T2 is deemed as the aimed temperature $T_C$, by calculating a temperature difference $\Delta t$ ($=T_C-T2$) between these temperatures and adding this temperature difference $\Delta t$ to a proceeding designated temperature T ($T_0=T+\Delta t$). Further, the designated temperature $T_0$ is renewed, in a case where the average between the pump drain temperature T1 and the outlet temperature T2 ((T1+T2)/2) is deemed as the aimed temperature $T_C$, by calculating a temperature difference $\Delta t$ ($=T_C-(T+T2)/2$) between these temperatures and adding this temperature difference $\Delta t$ to a proceeding designated temperature T ($T_0=T+\Delta t$). Furthermore, the designated temperature $T_0$ is renewed, in a case where the average between the pump drain temperature T1, the outlet temperature T2 and the temperature T3 of the operation oil in the static pressure pocket 22 ((T1+T2+T3)/3) is deemed as the aimed temperature $T_C$, by calculating a temperature difference $\Delta t$ ($=T_C-(T+T2+T3)/3$) between these temperatures and adding this temperature difference $\Delta t$ to a proceeding designated temperature T ($T_0=T+\Delta t$).

A temperature controller preliminary operation (BPIU output SUB) is executed as described hereinbefore with respect to the thus calculated designated temperature $T_0$ to thereby determine the actual designated temperature $T_0$, which is deemed as the temperature set by outputting the actual designated temperature $T_0$ to the interface for the specific use for the temperature controller, thus performing the feedback control. During the above operation, when the control temperature is within a range of the designated temperature (aimed temperature)$\pm(5/1000)$, the feedback control is not executed.

Further, in a case where only the feedback control is executed, the set time Q for the feedforward control is made zero (Q=0) and an initial value of the designated temperature $T_0$ is set to the aimed temperature $T_C$. According to these control modes, the gap h of the hydrostatic bearing can be controlled to be constant.

Figure 6:
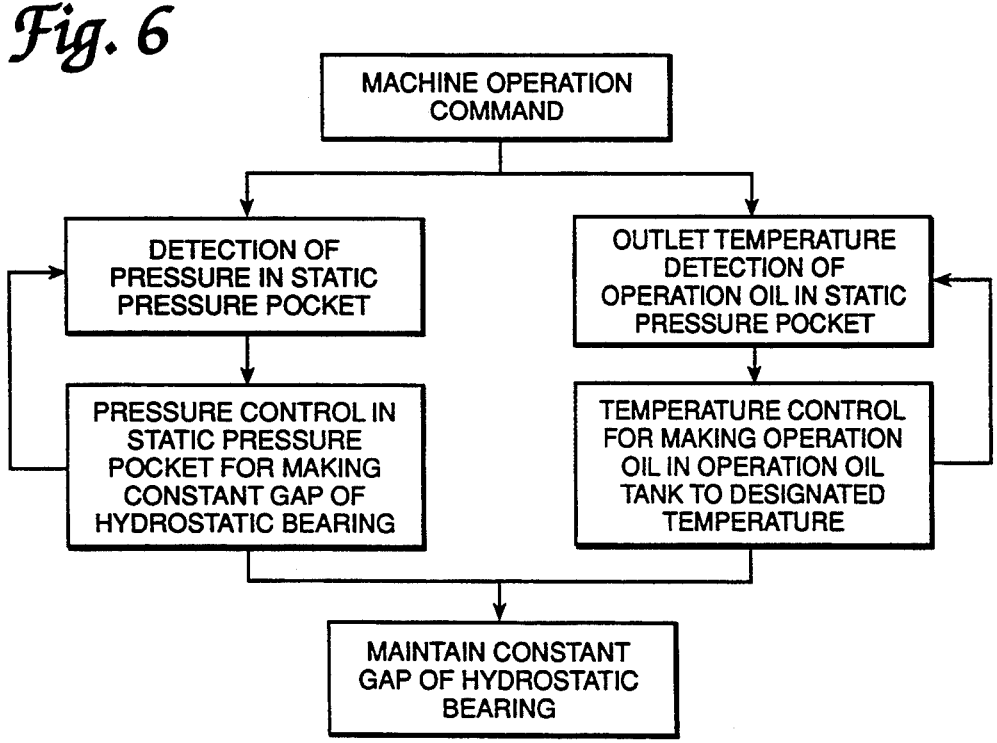
FIG. 6 is a flowchart showing a control mode executed by another embodiment of the bearing apparatus of the present invention.

FIG. 6 is a block diagram according to another embodiment of the present invention, in which a pressure in the static pressure pocket 22 is detected by the pressure sensor 31 and a feedback control is performed so that the detected pressure coincides with a predetermined pressure stored in a memory. This predetermined pressure is preliminarily determined experimentally so that the gap h of the hydrostatic bearing becomes a predetermined value, which is then stored in the memory as a pressure table. Further, the feedback control and, as occasion demands, the feedforward control is executed by detecting the outlet temperature of the operation oil in the static pressure pocket 22 by the temperature sensor 31 so that the detected temperature becomes the predetermined temperature stored in the memory. This predetermined temperature is preliminarily decided experimentally so that the gap h of the hydrostatic bearing becomes the predetermined value in the relationship between the pump drain oil temperature and the outlet temperature of the operation oil and the predetermined temperature is stored in the memory as the temperature table.

According to the control mode described above, the controlling operation can be simplified.

In the described embodiments, the proportional electro-hydraulic flow control valve is utilized as a pressure control means, but it will be replaced with, for example, a constant-pressure-ratio flow control valve for achieving substantially the same functions and effects.

Figure 7:
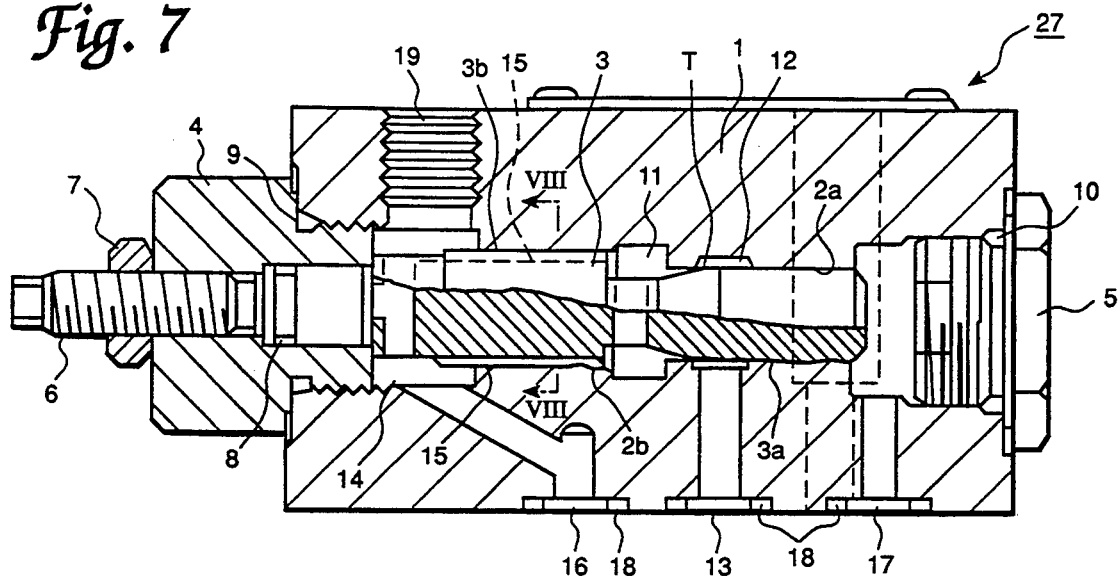
FIG. 7 is a longitudinal sectional view of a constant-pressure-ratio flow control valve provided as a pressure control means for the hydrostatic bearing apparatus of the present invention.

FIG. 7 is a sectional view showing a structure of a constant pressure ratio regulating valve 27.

Referring to FIG. 7, the regulating valve 27 is provided with a valve body 1 in which a hollow small diameter cylinder portion 2a and a hollow large diameter cylinder portion 2b are continuously arranged. Inside the small and large diameter cylinder portions 2a and 2b of the valve body 1 are slidably accommodated a spool 3 having a small and large diameter portions 3a and 3b. Both the end portions of the cylinder portions 2a and 2b are closed by a retainer 4 and a plug 5, respectively.

An adjustment screw 6 is screwed in the retainer 4 and fixed thereto by means of a nut 7. An O-ring 8 is interposed between the adjustment screw 6 and the retainer 4 and an O-ring 9 is also interposed between the retainer 4 and the valve body 1.

A first annular groove 11 forming a primary side chamber having a diameter larger than that of the large diameter cylinder portion 2b is formed to the connecting portion of both the cylinder portions 2a and 2b, and a second annular groove 12 is formed to an inner peripheral surface of the valve body 1 to which the small diameter portion 3a of the spool 3 is fitted, the second annular groove 12 being communicated with an suction port 13. The second annular groove 12 and the spool 3 constitute a variable orifice T. A worked groove 15 is formed to the outer peripheral surface of the large diameter portion 3b of the spool 3, the worked groove 15 being formed as an oil passage extending linearly along the longitudinal direction and connecting the primary and secondary side chambers 11 and 14, constituting a fixed orifice. The secondary side chamber 14 is communicated with a drain port 16.

According to the structure described above, the operation oil introduced into the primary side chamber 11 through the suction port 13 and the variable orifice T passes the working groove (passage) 15 formed as the fixed orifice and then flows in the secondary side chamber 14. The operation oil is thereafter drained externally through the drain port 16.

A chamber defined by the valve body 1, the spool 3 and the plug 5 is communicated with a drain port 17, and O-rings 18 are interposed at the end portions of these ports 13, 16 and 17. In FIG. 7, reference numeral 19 denotes a pressure take-out port.

The operation oil supplied into the constant pressure ratio regulating valve 27 through the suction port 13 is fed subsequently in order through the variable orifice T, the primary side chamber 11, the worked groove 15 as fixed orifice formed to the large diameter portion 3b of the spool 3 and the secondary side chamber 14. Since the secondary side chamber 14 is communicated with the static pressure pocket 22 through a passage, the operation oil fed in the secondary side chamber 14 is then supplied into the static pressure pocket 22 and then discharged into air or into a tank through the bearing gap t.

During this feed operation, the relationship between the flow rate $Q_1$ of a fluid passing the bearing gap h and the pressure $P_P$ in the static pressure pocket 22 is expressed as follows.

$$Q_1 = C_P h^2 P_P \tag{1}$$

in which $C_P$ designates a constant which is determined by a bearing shape of the hydrostatic bearing and a fluid viscosity of the operation oil.

As can be seen from the above equation (1), in order to maintain rigidity of the bearing infinite, that is, maintain constant the bearing gap h with respect to the change of the load, the bearing flow rate $Q_1$ and the bearing pocket pressure $P_P$ will be made proportional.

An original pressure $P_S$ of a highly pressurized fluid is reduced by the variable orifice T and then becomes the pressure $P_1$ in the primary side chamber 11. On the contrary, the pressure $P_2$ in the secondary side chamber 14 is equal to the pressure $P_0$ in the static pressure pocket 22, so that the relationship between a flow rate $Q_X$ in the worked groove 15, the supply pressure $P_1$ to the worked groove 15 and the pressure $P_0$ in the static pressure pocket 22 is expressed as follows.

$$Q_X = C_0(P_1 - P_P) \tag{2}$$

in which $C_0$ is a constant determined by the fluid viscosity of the operation oil and the shape of the worked groove 15.

Since in the steady operation mode, the flow rate QX of the operation oil passing the worked groove 15 equals to the flow rate Q2 of the operation oil passing the bearing gap t, the following equation will be obtained in accordance with the above equations (1) and (2).

$$Q_2 = Q_X = C_P \cdot h^2 \cdot P_P = C_O(P_1 - P_P) \tag{3}$$

$$\therefore P_P = \frac{1}{\left(1 + \dfrac{C_P}{C_O} h^2\right)} P_1$$

From the above equation (3), it will be found that the bearing gap h can be maintained to be constant by changing the supply pressure $P_1$ in response to the change of the pocket pressure $P_P$ in accordance with the load change so that the supply pressure $P_1$ becomes proportional to the pocket pressure $P_P$. Namely, in the equation (3), the bearing having the infinite rigidity can be obtained by making proportional the fixed orifice supply pressure $P_1$ to the pocket pressure $P_P$.

The variable orifice T formed by the valve body 1 and the spool 3 is controlled so that the pocket pressure $P_P$ and the fixed orifice supply pressure $P_1$ has the proportional relationship. That is, the spool 3 is moved by the change of the pressure $P_P$ in the static pressure pocket 22 and the degree of opening of the variable orifice T can be hence changed in accordance with the movement of the spool 3, thus changing the stationary orifice supply pressure $P_1$.

For example, when the pocket pressure $P_P$ increases, the spool 3 moves rightwardly as shown in FIG. 7 to thereby widen the opening of the variable orifice T so that the fixed orifice supply pressure $P_1$ approaches the original pressure $P_S$, thus being balanced.

Now assuming that a pressure receiving area of the spool 3 in the secondary side chamber 14 is $A_P$ and an effective pressure receiving area of the spool 3 in the primary side chamber 14 is $A_0$, the following equation will be obtained in accordance with balancing condition of the spool 3.

$$A_P \cdot P_P = A_O \cdot P_1 \tag{4}$$
$$\therefore P_P = (A_O/A_P) \cdot P_1$$

Consequently, in the constant-pressure-ratio flow control valve 27, the degree of opening of the variable orifice T is adjusted so as to establish the relationship represented by the equation (4) and, hence, the supply pressure PP to the fixed orifice is controlled.

Now, by forming the bearing, the fixed orifice and the constant pressure ratio orifice valve so as to have shapes making equal the proportional term in the equation (3) to the proportional term in the equation (4), that is, by forming them so as to satisfy the equation of $$\frac{1}{\left(1 + \dfrac{C_P}{C_O} h^2\right)} = \frac{A_O}{A_P}$$

the stationary orifice supply pressure $P_1$ is made proportional in response to the change of the pressure $P_P$ in the static pressure pocket, whereby the bearing gap h can be made constant, that is, the bearing rigidity can be made infinite.

A preferred embodiment will be formed with the number (n) of the worked grooves 15 being two, the groove width (w) being 0.5256 mm and the groove depth (b) being 1.354 mm, and then corresponding drilled hole (d) has a diameter of 1.00004 mm.

The worked groove 15 is worked with high surface roughness by, for example, using a super precision slicer, and the precisions in shape and dimension of the worked groove 15 can be improved. Furthermore, the freedom of the selection of the cross sectional shape of the worked groove 15 can be also improved to thereby improve the performance of the flow control valve as well as its quality.

The relationship between the cross sectional dimension ((b)×(w)) and the drilled hole (d) will be explained hereunder. Namely, when the fixed orifice is formed as a drilled hole, a flow rate $q_1$ of a fluid having an incompressible viscosity passing this drilled hole is expressed as follows.

$$q_1 = \frac{R_1 \cdot \pi \cdot d^4}{128 \cdot \mu \cdot l} (P_1 - P_2)$$

in which
$\mu$: coefficient of viscosity
l: length of drilled hole
$R_1$: coefficient of contraction
d: diameter of drilled hole
$P_1$: supply pressure (primary side chamber pressure)
$P_2$: outlet pressure (secondary side chamber pressure)

While, when the fixed orifice is formed by the worked groove 15, a flow rate $q_1$ of a fluid having an incompressible viscosity passing this worked groove 15 is expressed as follows.

$$q_2 = \frac{R_2 \cdot R_b \cdot b \cdot w^3}{12 \cdot \mu \cdot l} (P_1 - P_2)$$

in which
$R_2$: coefficient of contraction
w: width of groove
b: depth of groove Cb: shape coefficient (coefficient determined by ratio of groove width w and groove depth b)

Accordingly, n numbers of worked grooves 15 having the same dimension are formed on a circumference, a diameter d of an equivalent drilled hole is expressed as $$d = \sqrt{\frac{128 \cdot n \cdot Cb \cdot b \cdot w^3}{12\pi}}$$

in which $q_1 = nq_2$ and $R_1 = R_2$.

The following table shows one example showing the relationships between these values, in which n=2, b=0.5 mm or w=0.5 mm.

| b (mm) | w (mm) | d (mm) | Δd μm | b (mm) | w (mm) | d (mm) | Δd μm |
|---|---|---|---|---|---|---|---|
| 0.5 | 0.3 | 0.4894 | — | 1.05 | 0.5 | 0.8877 | 15.2 |
| 0.5 | 0.35 | 0.5371 | 47.7 | 1.1 | 0.5 | 0.9022 | 14.5 |
| 0.5 | 0.4 | 0.5797 | 42.6 | 1.15 | 0.5 | 0.9160 | 13.8 |
| 0.5 | 0.45 | 0.6175 | 37.8 | 1.2 | 0.5 | 0.9292 | 13.2 |
| 0.5 | 0.5 | 0.6507 | 33.2 | 1.25 | 0.5 | 0.9420 | 12.8 |
| 0.55 | 0.5 | 0.6827 | 32.0 | 1.3 | 0.5 | 0.9542 | 12.2 |
| 0.6 | 0.5 | 0.7113 | 28.6 | 1.35 | 0.5 | 0.9660 | 11.8 |
| 0.65 | 0.5 | 0.7372 | 25.9 | 1.4 | 0.5 | 0.9774 | 11.4 |
| 0.7 | 0.5 | 0.7609 | 23.7 | 1.45 | 0.5 | 0.9885 | 11.1 |
| 0.75 | 0.5 | 0.7827 | 21.8 | 1.5 | 0.5 | 0.9992 | 10.7 |
| 0.8 | 0.5 | 0.8030 | 20.3 | 1.55 | 0.5 | 1.0095 | 10.3 |
| 0.85 | 0.5 | 0.8219 | 18.9 | 1.6 | 0.5 | 1.0196 | 10.1 |
| 0.9 | 0.5 | 0.8398 | 17.9 | 1.65 | 0.5 | 1.0294 | 9.8 |
| 0.95 | 0.5 | 0.8566 | 16.8 | 1.7 | 0.5 | 1.0389 | 9.5 |
| 1.00 | 0.5 | 0.8725 | 15.9 | 1.75 | 0.5 | 1.0482 | 9.3 |

In the next, the coefficient of contraction, in the case of the fixed orifice being formed by the worked groove 15, is inversely operated by flow measurement data.

Figure 9:
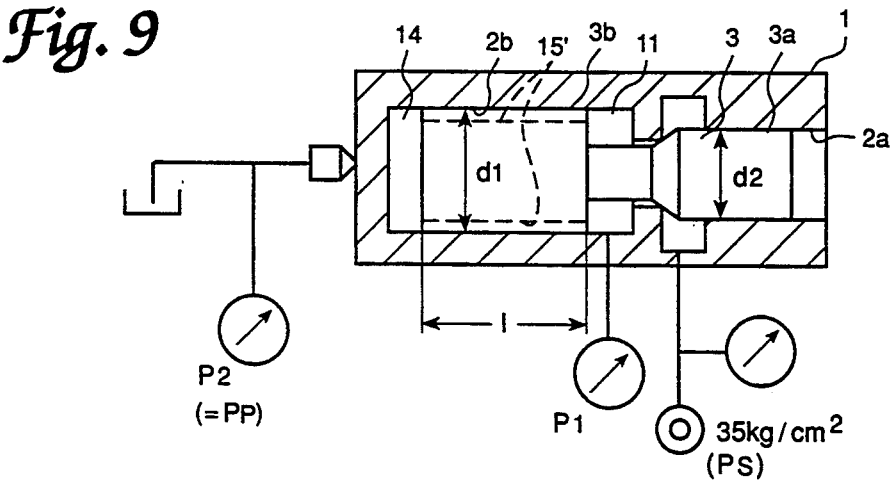
FIG. 9 is a view for the explanatory of obtaining a coefficient of contraction according to the present invention.

As shown in FIG. 9, it is assumed that the number n of the working grooves 15' is two (2), the sectional dimension is 0.467 mm×0.3257 mm (b=0.467 mm, w=0.3257 mm), the diameter $d_1$ of the large diameter cylinder portion 2b of the valve body 1 is 14 mm ($d_1$=14 mm), the diameter $d_2$ of the small diameter cylinder portion 2a of the valve body 1 is 13 mm ($d_2$=13 mm), and the supply pressure is 35 Kgf/cm². In such case, the following equation will be obtained in accordance with the theory of the constant pressure ratio static pressure orifice valve.

$$\frac{\pi}{4} \cdot 1.4^2 \cdot P_2 = \frac{\pi}{4}(1.4^2 - 1.3^2) P_1$$

Differential pressure $P_1 - P_2 = 6.26 \, P_1$

Ratio $P_2/P_1 = 0.138$

In this equation, the diameter d of the equivalent drilled hole with respect to the worked groove 15' having the above sectional dimension becomes d=0.5005 mm.

While, the flow rate q passing the fixed orifice formed by the drilled hole and, hence, the coefficient R of contraction will be represented by the following equations.

$$q = \frac{R \cdot (P_1 - P_2)\pi \cdot d^4}{128 \cdot \mu \cdot l} \cdot \frac{60}{1000} \text{ (CC/min)}$$

$$\therefore R = \frac{128 \cdot \mu \cdot l \cdot q}{(P_1 - P_2)} \cdot \frac{1000}{60}$$

When the flow rate actually measured data q=400 cc/min, the pressure actually measured value $P_1$=4.5 Kgf/cm², the length l of the drilled hole (l=25 mm) the viscosity μ of using oil corresponding to that of ISO VG 46 (μ=about 30 ost=2.62×10⁻⁷ Kg sec/cm²) are all inserted into the above equation. Then, the R is calculated as follows.

$$R = \frac{128 \times 2.62 \times 10^7 \times 25 \times 400}{6.26 \times 4.5 \times \pi \times 0.5005^4} \cdot \frac{1000}{60} = 1.01$$

From this calculation, it is found that the coefficient R of contraction of the fixed orifice composed of the worked groove 15' becomes approximately 1.

An inverse operation of the coefficient R of contraction is executed in the case of the constant pressure ratio static pressure orifice valve having a ratio of 0.8, and in this operation, the respective values are as follows.

Number n of the working groove: 2; Sectional dimension: 1.228 mm×0.3256 mm (b=1.228 mm, w=0.3256 mm); Diameter $d_1$ of the large diameter cylinder portion 2b of the valve body 1: 17 mm ($d_1$=17 mm); Diameter $d_2$ of the small diameter cylinder portion 2a of the valve body 1: 13 mm ($d_2$=7.6 mm); Differential pressure: $P_1 - P_2 = 0.25 \, P_2$; Equivalent drilled hole diameter: d=0.6982 mm; Flow actual value: q=175 cc/min; Outlet pressure (secondary side chamber pressure) actually measured value: $P_2$=15 Kgf/cm².

According to these values, the coefficient R of contraction is calculated as follows.

$$R = \frac{128 \times 2.62 \times 10^{-7} \times 25 \times 175}{0.25 \times 15 \times \pi \times 0.6982^4} \cdot \frac{1000}{60} = 0.8734$$

Namely, in this case, the coefficient R of contraction based on the inverse operation is R=0.8734.

According to this example, it is found that the coefficient R of contraction can be made within 0.9 to 1.0 in the case where the fixed orifice is constituted by the working groove 15.

Figure 8:
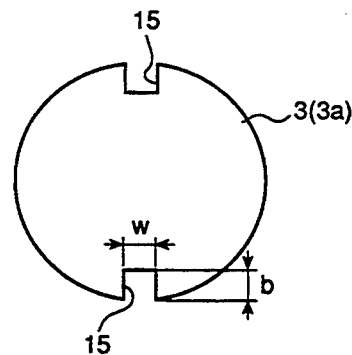
FIG. 8 is a sectional view taken along the line VIII—VIII shown in FIG. 7.
Figure 10:
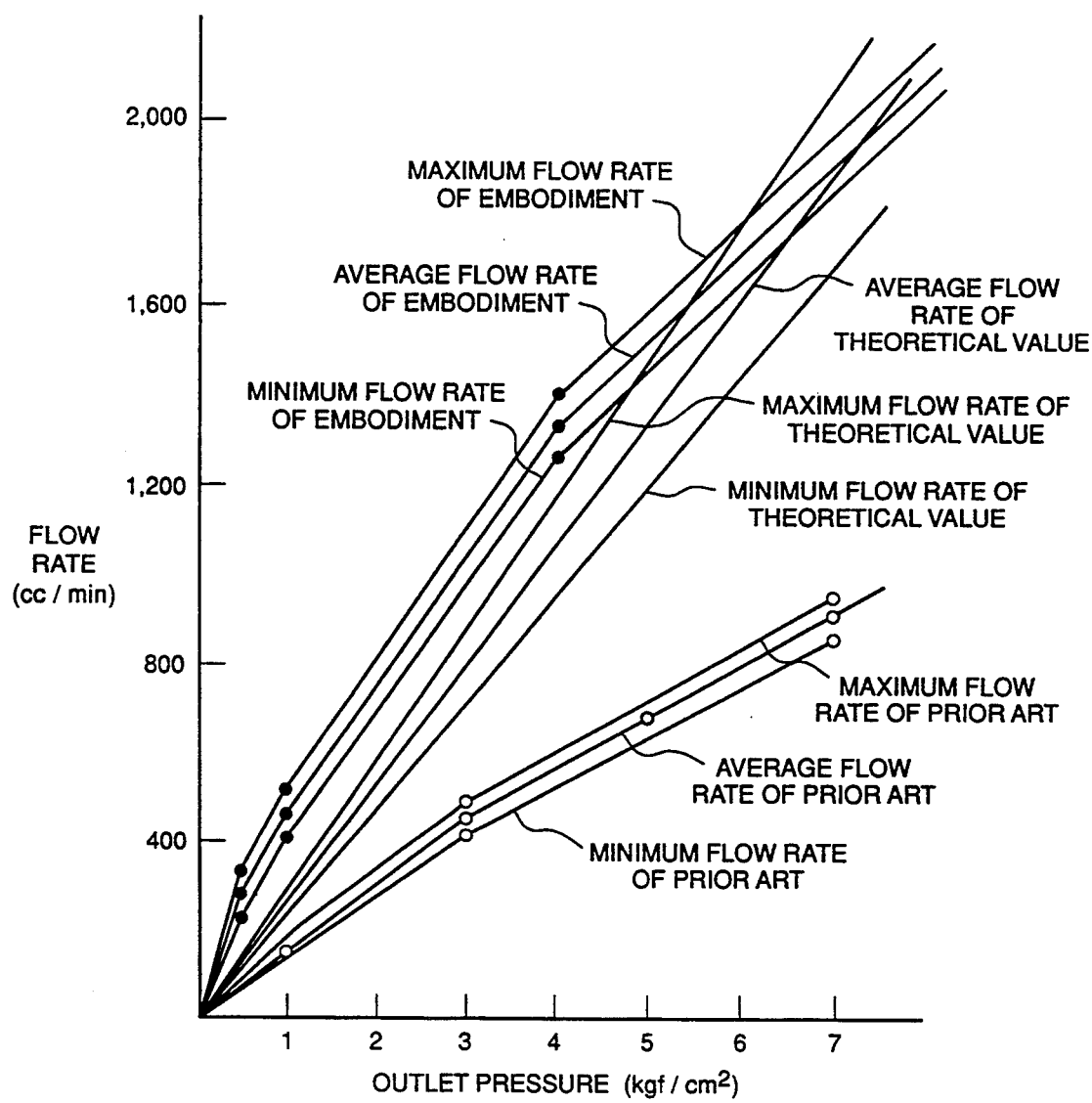
FIG. 10 is a graph showing pressure—flow rate characteristics between the embodiments of the present invention, the prior art and the theoretical values.

FIG. 10 shows the comparison of the prior art in which the fixed orifice, i.e. oil passage, is formed by the drilled hole with the embodiment of the present invention represented by FIGS. 7 and 8 in which the fixed orifice, i.e. oil passage, is formed by the worked groove 15, with reference to the theoretical values and the characteristics shown by a graph of pressure—flow rate. The reason why the theoretical values include the average flow rate value, the maximum flow rate value and the minimum flow rate value is resulted from the consideration of dispersion on working and it seems that this fact is common to the prior art and the present embodiments.

In the compared examples, the prior art shows the fixed orifice formed by a drilled hole having a diameter of 1 mmφ, and in this case, the coefficient R of contraction is within 0.5 to 0.6. On the contrary, in the embodiments shown in FIGS. 7 and 8 in which the fixed orifice is formed by the worked groove 15 corresponding to a drilled hole having a diameter of 1 mmφ, the coefficient R of contraction is within 0.9 to 1.0.

As is apparent from FIG. 10, characteristics represented by this graph follow the characteristics of the theoretical values in conformity therewith due to the difference in the coefficients of contraction, thus providing an improved responsibility.

According to the present invention of the characters described above, there is provided a hydrostatic bearing having the infinite rigidity keeping constant the bearing gap regardless of the change of the load by moving the spool so that the pressure in the first annular groove (primary side chamber) and the pressure in the static pressure pocket are proportional to each other.

Furthermore, since any spring means is not utilized, it is not necessary for a variable orifice valve to have a specific shape for compensating for the spring constant of the spring. Accordingly, the gap having a constant static pressure can be surely maintained even in the case of widely changing the pocket pressure, particularly, in the case of the low pressure in the static pressure pocket, and moreover, the hydrostatic bearing apparatus itself can be made compact with relatively simple structure.

As described hereinbefore, according to the present invention, the temperature and the pressure in the static pressure pocket in the hydrostatic bearing can be controlled to be maintained always constant, whereby the gap of the bearing can be also maintained constant, thus carrying out a precision working with high performance.

What is claimed is:

1. A method of controlling a gap between a static pressure guide surface and a member to be supported of a hydrostatic bearing apparatus provided with a static pressure pocket means so as to be maintained constant, comprising:

detecting a pressure in the static pressure pocket means;

calculating a designated pressure of the operation oil for making constant the gap of the hydrostatic bearing apparatus in response to the detected pressure;

controlling a supply pressure of the operation oil so that a pressure in the static pressure pocket means becomes the designated pressure;

detecting a temperature of the operation oil in the static pressure pocket means and a temperature thereof at an outlet portion of the static pressure pocket means;

calculating a designated temperature for supply to the static pressure pocket means for making constant the gap of the hydrostatic bearing apparatus in response to the detected temperatures; and controlling the supply temperature of the operation oil so that a temperature of the operation oil to be supplied to the static pressure pocket means becomes said designated temperature for supply.

2. A method according to claim 1, wherein the control of the temperature of the operation oil is carried out by a feedforward control by a predetermined set time and then a feedback control.

3. A method according to claim 2, wherein the feedforward control is changed to the feedback control when the set time becomes zero and the feedback control is performed so that a deviation between a temperature to be controlled and an aimed temperature becomes zero.

* * * * *